Figure 1:
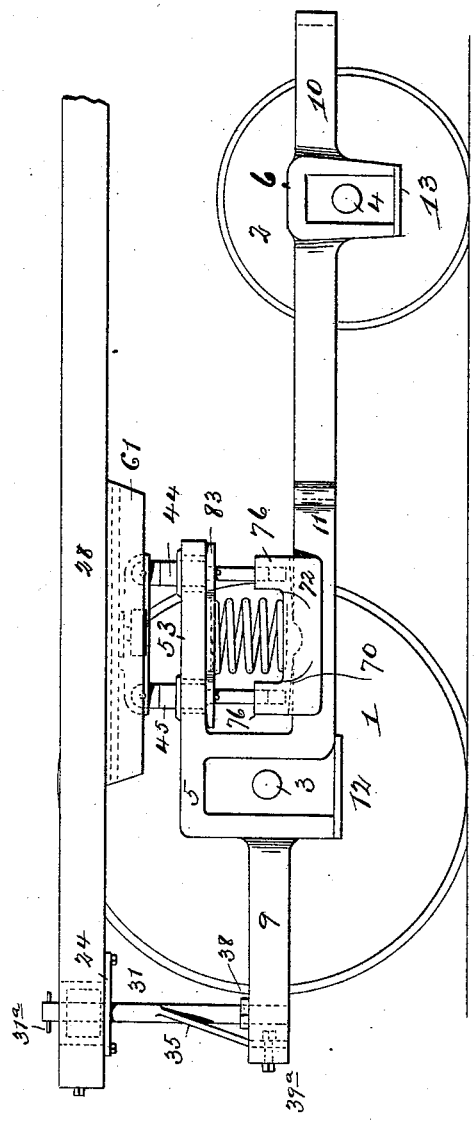

(No Model.) 4 Sheets—Sheet 1.

W. S. ADAMS.
MOTOR TRUCK.

No. 538,857. Patented May 7, 1895.

WITNESSES:
C. W. Benjamin
William Jacobsen.

INVENTOR
Walter S. Adams.
BY Joseph L. Levy
ATTORNEY

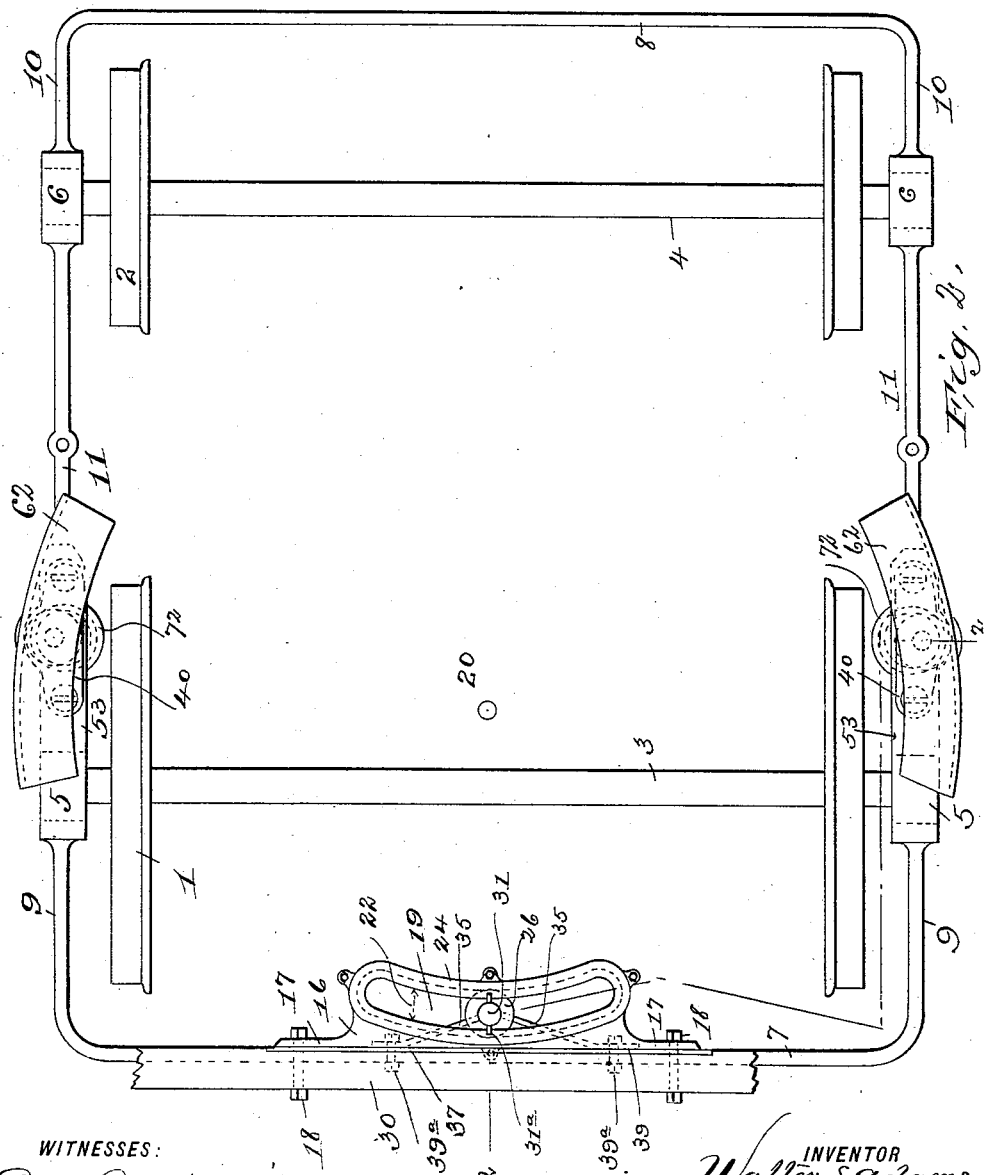

(No Model.) 4 Sheets—Sheet 3.
W. S. ADAMS.
MOTOR TRUCK.
No. 538,857. Patented May 7, 1895.
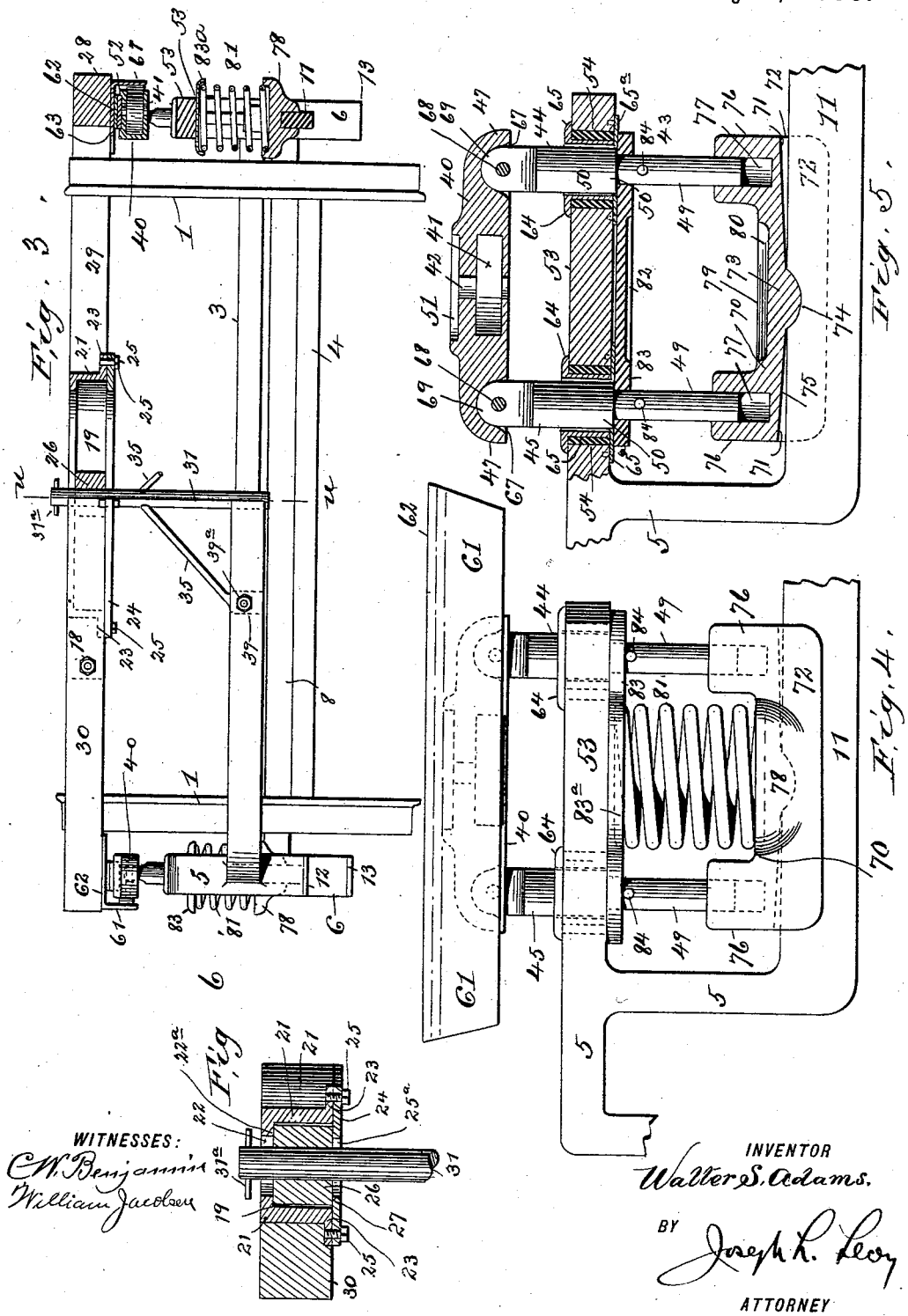
WITNESSES:
C. W. Benjamin
William Jacobsen
INVENTOR
Walter S. Adams.
BY Joseph L. Levy
ATTORNEY (No Model.)  4 Sheets—Sheet 4.
W. S. ADAMS.
MOTOR TRUCK.
No. 538,857. Patented May 7, 1895.
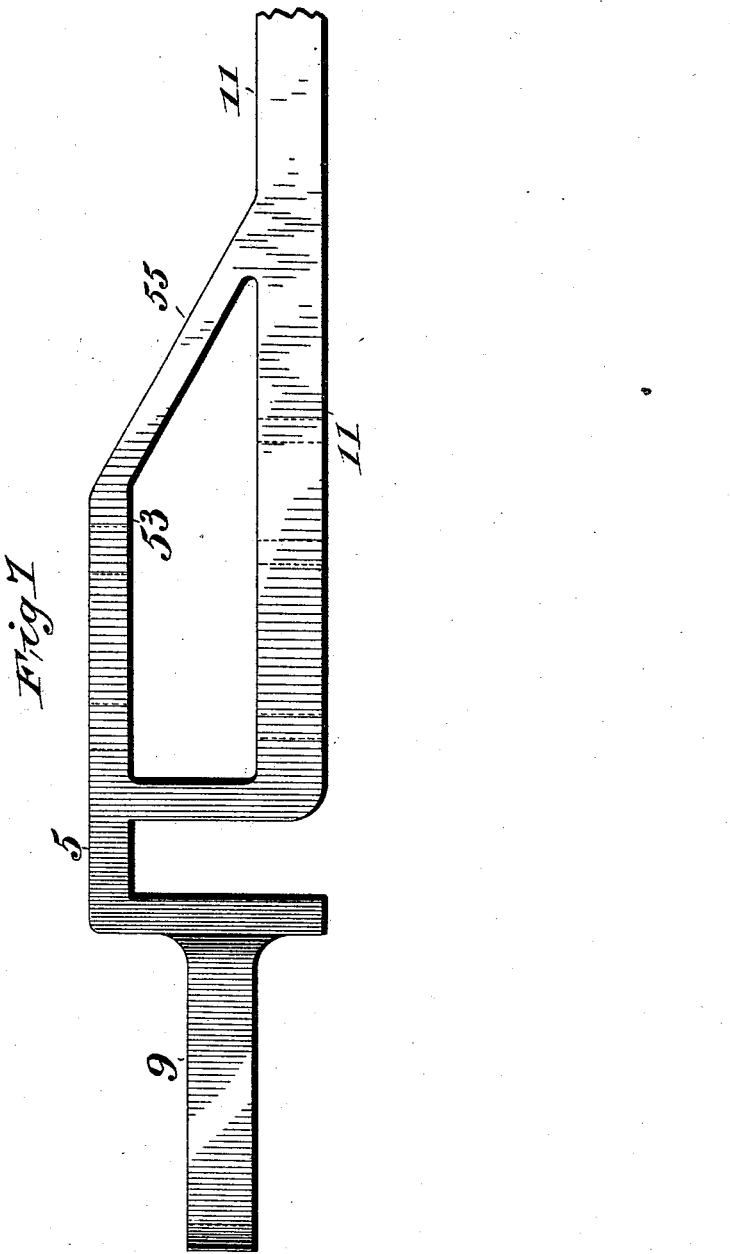
WITNESSES:
C. W. Benjamin
William Jacobsen
INVENTOR
Walter S. Adams.
BY Joseph L. Levy
ATTORNEY
THE NORRIS PETERS CO., PHOTO-LITHO., WASHINGTON, D. C.

UNITED STATES PATENT OFFICE.

WALTER S. ADAMS, OF PHILADELPHIA, PENNSYLVANIA, ASSIGNOR TO JOHN A. BRILL, OF SAME PLACE.

MOTOR-TRUCK.

SPECIFICATION forming part of Letters Patent No. 538,857, dated May 7, 1895.

Application filed November 5, 1894. Serial No. 527,954. (No model.)

*To all whom it may concern:*

Be it known that I, WALTER S. ADAMS, a citizen of the United States, residing at Philadelphia, in the county of Philadelphia and State of Pennsylvania, have invented certain new and useful Improvements in Motor-Trucks, of which the following is a specification.

My invention relates to improvements in motor trucks used on electrically and otherwise propelled cars, and especially to pivotal trucks of the maximum traction class, wherein the pivotal center, whether a physical one or merely a point, is arranged to obtain the greatest tractive power.

The present case has reference to the subject matter of the joint application filed by John A. Brill and myself on the 17th day of February, 1893, Serial No. 462,730.

My present invention consists in the novel arrangement and construction of what are called the bearing bolsters, and in the further novel features hereinafter described and pointed out in the claims.

In the drawings forming part of this specification, Figure 1 is a side elevation of a complete truck (minus the axle-boxes) and a portion of a car-body, showing an embodiment of my improvements; Fig. 2, a plan view of Fig. 1; Fig. 3, an end elevation of Fig. 1, partly in section, said view being taken approximately on the line $z\ z$, Fig. 2; Fig. 4, an enlarged side elevation of a portion of the axle-box frame of the truck, showing the truck-bearing bolster and car rub-plate; Fig. 5, a like view partly in section, said section being taken approximately through the longitudinal center of the parts shown in Fig. 4, with the car rub-plate removed; Fig. 6, an enlarged cross-section of the draw-bar and head secured to the car-body, taken on the line $u\ u$, Fig. 3; Fig. 7, a side elevation of a modification of the axle-box frame of the truck.

Similar numerals of reference refer to like parts throughout the several views.

In the drawings 1 are the driving wheels and 2 the trailing wheels, the driving wheels being larger in diameter than the trailing wheels; 3, the axle for the driving wheels, and 4, the axle of the trailing wheels.

One of the prominent features of this truck is that both the drawing and pivotal devices are secured to or connected directly with that part of the truck frame which confines the axle boxes and axles in place and preserves the parallelism of the axles, which frame is supported entirely upon the axle boxes and does not move with the motion of the supported car body. This frame is what is termed an axle box frame, and it may have, though independently of the movement of the car on its springs, a slight movement up and down on the axle boxes when it is elastically supported thereon. This frame comprises in the drawings the yokes 5 which embrace the axle boxes (not shown) of the axle of the driving wheel, and the yokes 6 which perform a like function for the axle boxes (not shown) of the trailing wheel axle.

The axle box frame is rectangular in plan and comprises the cross bars 7, 8, extensions 9, 10 and central sections 11.

The axle box frame in its entirety is of wrought iron made into one homogeneous piece of metal; and by reason of the difference in dimensions of the wheels, the axle boxes are located at different heights, and the frame is so conformed to properly locate the yokes against which the sides of the axle boxes bear, so that, as shown, the yokes are so related to the main web of the frame that the line of the axle will be about central in the yokes, the extensions 9 and cross bar 7 being higher than the rest of the frame. Strap braces 12, 13 can be secured to the lower portions of the yokes in any desirable way to brace the same.

One of the prominent features of this truck lies in securing the truck to the car body for the purpose of enabling it to propel the car, or the car to draw it by devices which permit of the movement of the same laterally of the truck or car in the arc of a circle. To this end I secure what I term a draw head 16 by means of lugs 17 cast thereon, through which lugs pass bolts 18, to the cross sill 30 of the car, which lies without the wheel base and forward of the driving wheels, a plate 37 of iron being interposed between the sill and draw head for the better securement of the draw head to the sill. This draw head is provided with a segmental channel 19 having the pivotal center of the truck (which is encompassed within a circle 20, Fig. 2) as a center, said channel being formed by the two upright segmental walls 21. The top of the channel is provided with a segmental slot or opening 22 of any desired size, the slot 22 being narrower than the channel 19, forming a segmental flange 22ª on each side of the channel. See particularly Fig. 6. As shown in said before-mentioned application, the draw head is secured to the front cross bar of the axle box frame, and in order to secure the same to the car sill 30, as shown in this case, the draw head may be inverted, as in Fig. 6, or said draw head can be so cast as to permit of a restraining plate 24, to be described, to be presented upward. Apertured lugs 23 (Fig. 6) are formed on the extremities of the draw head and on each side of the channel, centrally, one of said lugs lying under the sill 30, by means of which an extra point of affixture can be secured in addition to the bolts 18. A restraining plate 24, provided with a segmental slot 25ª, is secured over the channel 19 by means of the nuts 25, which pass through apertures in the lugs 23. A roller 26 having a central aperture normally rests upon the segmental ledge 27 formed by the inward extension of the restraining plate 24; or if the restraining plate is on top, as in Fig. 2, the roller can rest on the flanges 22ª. This roller is adapted to bear against either the front or back wall 21 and to move within the channel 19, and it may have a free fit, as indicated in Fig. 6, to enable the bolsters, to be described, to have a longitudinal vibrational movement, fore and aft, on the axle box frame.

Connection between the truck and car body is made as follows: At 28 are the longitudinal sills of the car and 29, 30 some of the cross sills. Secured to the cross bar 7, which is directly below the draw head 16, is a vertically disposed and inflexible draw bar 31, the lower portion of which may be provided with a lug 38 for securing it to the cross bar, or it might be otherwise secured. By reference to Figs. 2 and 6 it will be noticed that the upper portion of the draw bar 31 is cylindrical (the lower portion not being of necessity so) and passes freely through the roller 36, the union being such that the draw bar 31 can play vertically up and down within the roller (or vice versa) to allow for the play of the car on its springs, a pin 31ª being used to prevent the disengagement of the draw bar from the draw head. To brace the upper part of the draw bar I provide it with two diagonal braces 35, preferably forged upon the draw bar as shown, the ends of the braces being provided with plates 39, through which pass bolts 39ª for securing the braces to the cross bar 7, thus firmly holding the draw bar in a vertical position.

From the foregoing it will be seen that the car and truck are united for drawing purposes by devices which permit of the car and truck vibrating in relation to each other, which devices are carried bodily by the car and truck in their swiveling movement, and that the truck can be propelled by power applied to the car or vice versa, the drawing connections being secured without the wheel base and forward of the driving wheels.

Thus far I have described the means for positively uniting the car and truck for the purpose of drawing or propelling the same. I shall now proceed to describe the means for supporting the car upon the truck, means for permitting a pivotal or swiveling action between them, and the peculiarity of the arrangement of the parts, which means embrace bearing bolsters adapted to have a rectilinear, swinging or rocking movement in the line of travel of the truck and car, or in the opposite direction, or transversely of the truck.

The truck side bearings, which form part of said means, comprise the casting 40 and the roller 41 mounted transversely within a cavity in the casting and extending without the same, which roller is rotatably mounted upon a spindle 42, itself preferably rotatably mounted in bearings in the casting to reduce the friction. The bearing is supported upon the spring posts 43, which are supported upon the axle box frame adjacent to the axles of the driving wheels and preferably between the wheel base center of the truck and said axle, a portion of the axle box frame forming both a part-pedestal and a guide for the spring posts. The spring posts have enlargements 44, 45, upon which the side bearing 40 rests and to which it is movably secured. The lower parts of the spring posts are reduced in diameter and form guide posts 49, the union of the enlargements 44, 45 and guide posts forming a shoulder 50, Figs. 4 and 5. The top of the bearing is provided with a rectangular cavity 51, in which is located a friction plate 52 of suitable metal.

The bearings are constructed in accordance with an application filed by John A. Brill and myself on the 2d day of August, 1892, Serial No. 441,984, to which cross reference is made.

For guiding the upper portions of the spring posts in their movements up and down, and for bracing and holding them in position at this point, the axle box frame is provided with a guide arm or pedestal 53, which is provided with a series of apertures 54, Fig. 5, through which the enlargements of the spring posts pass. This arm is derived from and preferably made integral with the yokes 5, and preferably extends flush with the top thereof.

If desired, the section 11 of the axle box frame and the arm 53 can be united for the purpose of strengthening the guide arm 53 by a brace 55, which may be either integral with or separable from the arm 53 and section 11 of the axle box frame, and when made, as illustrated in Fig. 7, cause the pedestal to be continuous with the axle box frame. This will securely brace the pedestal or guide bar 53 against distortion or fracture.

By reference to Fig. 5 it will be seen that the ears 47 of the bearing 40 have an arched shaped aperture 67, the sides of the ears adjacent to such aperture being provided with holes, through which a pin 68 passes. This aperture is adapted to contain the reduced and squared portion 69 of the spring posts, which is segmental at the top and which is likewise provided with a hole, through which the pin 68 passes. The segmental top of the portion 69 bears against the arch of the aperture 67 and the bearing 40 rests on such segmental portion, the pin 68 merely holding the parts in position. Thus it will be seen that with the other parts of the bearing bolster being capable of a play in the line of travel of the truck (fore or aft), the bearing can be maintained parallel with the rub plates on the car body and squarely support the same. The lower part of the bolster is pivotally mounted on the side bars by means of the rocking spring-plate or cradle 70. The lower part of this cradle or casting is provided with a groove or channel 71, which may be segmental, and which is formed by the depending lips 72, which embrace the side bar 11, and within the channel is a depending boss 73, which is preferably segmental in form, and which sets within a segmental recess 74 formed in the side bar 11. This recess and boss hold the spring-plate or cradle in position, and the upper wall of the channel 71 is formed segmental, as shown at 75, so as to enable the casting to rock on the side beam. At the ends of the casting 70 are formed two upright lugs 76, within which is a preferably circular aperture 77, and between the two lugs is a swell 78, Fig. 3, having between the lugs 76 an annular wall 79, within which is a circular recess 80. The spring post spindles 49 extend down into the apertures 77 and are guided in their movements up and down thereby, the cradle tying the two posts together.

As seen, the enlargements 44, 45 and spindles 49 are capable of a movement within their respective guides and braces, both longitudinally and laterally of the truck, and to accommodate for the wear of these parts in their guides, and especially within the arm 53, a bushing 64 is inserted therein against which the enlargements 44, 45 abrade in their movements, and these bushings are preferably elastically backed in the apertures 54 by rubber or other elastic cushions 65 of any desired form, an apertured plate 65ᵃ secured to the under side of the arm 53 being used to keep the cushions in place. This arrangement will permit the car body to have a movement, as before set forth, in relation to the truck, or vice versa, which movement is elastically cushioned, the union of the draw bar and roller 26 with the channel in the draw head 16 permitting a like movement, as more clearly shown in Fig. 6. Extending between the spindles 49 is a spring cap or plate 83, which is apertured to permit the spindles to pass therethrough, and pins 84 support said plate against the shoulder 50 of the spring posts. The plate 83 is provided with a swell 83ᵃ and annular recess 82, and between this recess and the recess 80 extends a spiral spring 81, which elastically supports the truck bearings on the side bar.

The car bearings or rub plates comprise the segmental angle iron 61, the depending face of which is disposed in the arc of a circle, the center of which lies within the point 20, Fig. 2 (which is the pivotal center of the truck), the longitudinal top plate 62 of which is secured to one of the longitudinal or side sills 28 of the car, the top plate having an additional friction plate 63 fast thereto, which is adapted to bear upon the friction plate 52, the roller 41 bearing against the vertical side of the rub plate, as shown in Fig. 3.

The foregoing (excepting the rub plates) comprises what I term the independent and disconnected bearing bolsters, as they form the truck element of the pivotal devices, the bearings being supported by a bolster which performs the same function in this regard, as does the usual truck center bearing, each bearing bolster being entirely independent of and transversely disconnected from the bolster on the opposing side of the truck, pivotally securing the car and truck together, without mechanical connection to the point about which the car and truck move, and securing this relation without connection with each other. It is thus clear that should the bearing 40 be subjected to movement in the direction of the line of travel of the truck, or vice versa, independent of the truck's movement, the bolster can accommodate itself to such movement, the passage of the spring posts through the guide arm 53 permitting of the same, as before described.

Instead of using one large spring two springs could be employed and caused to encircle the spring posts, for which adaptation it would only be necessary to enlarge the top of the lugs 76 or place independent spring plates about the spindles at that point, and place other spring plates against the shoulder 50. Thus I provide what I term the rocking bearing bolsters, which springs support the carbody on both sides of the truck and take up and accommodate the movements of either the truck or the car other than that of propulsion, or the up and down movement on the springs, allowing also those before set forth.

It is apparent that many changes and modifications can be made in the structure herein shown and described without departing from the spirit of my invention, and that the bearing bolsters and other features of construction are not limited in their use to maximum traction trucks, but can also be used in trucks where the pivotal point is centrally and mechanically located.

Having described my invention, I claim—

1. The combination, with an axle box frame, of cradles thereon for permitting a longitudinally rocking motion, springs on said cradles, side bearings and spring posts resting on said springs, and a car body resting on said side bearings, substantially as described.

2. The combination, with an axle box frame, of oscillatory cradles on said frame, springs on the cradles, bearings supported by the springs on said cradles, and a car body having a sliding motion on said bearings, substantially as described.

3. The combination, with an axle box frame, having rearward extensions above the main members, of cradles on said frame, springs on the cradles, bearings supported by the springs on said cradles, said bearings being guided by said extensions and having a vertical motion in said extensions, and a car body supported on said bearings, substantially as described.

4. The combination, with an axle box frame, of cradles supported thereon, bearing posts supported on said cradles, bearings pivotally secured on said posts, and a car body supported on said bearings, substantially as described.

5. In a car truck, an axle box frame having the side bars, a cradle on each of said side bars, a spring resting in a recess in each of said cradles, and recesses in said cradles on opposite sides of said spring, combined with a recessed plate resting on each of said springs, said plate having openings on opposite sides of said springs, supporting posts in said openings supported by said plate, and bearings pivotally connecting said posts in pairs, substantially as described.

6. The combination of a car body, and a truck, with an axle box frame having side bars, springs, cradles for the springs resting on the side bars, plates on the springs, bearings and posts supported by said plates and springs, and curved restraining plates on the car body resting on the bearings, substantially as described.

7. In a car truck, an axle box frame having side bars, a cradle on each of the side bars, a spring resting in a recess in each of said cradles, and recesses in said cradles on opposite sides of said springs, combined with a recessed plate resting on each of said springs, said plate having openings on opposite sides of its spring, supporting posts in said openings entering the cradles, and bearings connecting said posts in pairs, substantially as described.

8. The combination, with the bearing 40 and bar 53, of the spring posts movably secured to the bearing, the posts passing through the said bar, and means for movably securing the lower ends of the said posts together, substantially as described.

9. The combination, with the apertured bar 53, of the spring posts extending through the apertures, the bearing 40 pivotally secured to the top of said posts, the side bar 11, and a cradle on the side bar receiving the ends of the spring posts, whereby a rocking movement of the bearing can be had, substantially as described.

10. The combination, with the bar 53, apertures therein, of the bearing 40 having the recesses 67, the spring posts having rounded ends within said apertures, the posts passing through the bar 53, and means for connecting the lower ends of said posts, substantially as described.

11. The combination, with the side bar 11 and the apertured bar 53, of the casting 70 having the tubular lugs 76 and the recess 80, the spring posts extending through said apertures, the bearing 40 on said posts, the plate 83 engaging said posts, and a spring extending between the plate and casting, substantially as described.

12. The combination, with the side bar 11, of the casting 70 having the depending lips 72 straddling the side bar, the bearing 40, spring posts, the plate 83, and a spring extending between the casting 70 and said plate, substantially as described.

13. The combination, with the side bar 11, of the casting 70 having the segmental channel 75 bearing on the side bar, the upwardly extending tubular lugs 76, the recess 80, the bearing 40, the spring posts connecting the bearing and casting and entering the tubular lugs, a spring between the casting and bearing, and the bar 53 for guiding said posts, substantially as described.

14. The combination, with the apertured bar 53, of the bearing 40 having the arched recesses 67, the spring posts having the flattened and rounded extensions 69, the bearings resting on said rounded ends, the pins 68 passing through said ends and the bearing, a spring supporting said posts, and means for guiding the lower ends of said posts, substantially as described.

15. The combination with the side bar 11, the casting 70 thereon having the recess 80 and tubular lugs 76, the spring posts having the enlargements 44, 45 and spindles 49, shoulders 50 on the posts, a bar 53 having apertures engaging the enlargements, a cross plate 83 on the posts engaging said shoulder, and a spring 81 extending between said plate and casting, substantially as described.

16. The combination with the bearing 40, the spring posts supporting it, guides for the posts, the cross plate 83 engaging the posts and having the recessed enlargement 82, the casting 70 engaging the ends of said posts, and a spring 81 between said plate and casting, substantially as described.

17. The combination, with the side bar 11 having the recess 74, of the casting having the segmental boss 73 engaging said recess, the depending lips 72 straddling the side bar, and the segmental channel 75, the spring posts, the cross bar 83 engaging the posts, the bearing 40, and a spring supporting the bearing on said casting, substantially as described.

18. The axle box frame having the yoke 5, the side bar 11 extending from the lower portion of said yoke, the arm 53 extending from the upper part of the yoke parallel with the side bar, the brace 55 connecting the arm and side bar, and the extension 9 extending from the opposite leg of the yoke between its top and bottom, substantially as described.

19. The combination with the side bars of the axle box frame, of the spring supported bearing bolsters having guides for their movements in said frame, and rocking cradles on said side bars supporting said springs and bolsters, whereby said bolsters can have a rocking movement on the side bars in a direction longitudinal of the frame independently of their vertical movement on said springs, substantially as described.

WALTER S. ADAMS.

Witnesses:
M. H. McNEIL,
HENRY C. ESLING.